United States Patent [19]

Kanamori et al.

[11] Patent Number: 5,693,116
[45] Date of Patent: Dec. 2, 1997

[54] PROCESS FOR PRODUCING OPTICAL WAVEGUIDE

[75] Inventors: Hiroo Kanamori; Chisai Hirose, both of Yokohama, Japan; Yuji Matsuura, Piscataway, N.J.

[73] Assignee: Sumitomo Electric Industries, Ltd., Osaka, Japan

[21] Appl. No.: 426,139

[22] Filed: Apr. 21, 1995

[30] Foreign Application Priority Data

Apr. 22, 1994 [JP] Japan .................................. 6-084630

[51] Int. Cl.$^6$ .............................. C03B 8/04; C03C 17/02; G02B 6/10
[52] U.S. Cl. ................................. 65/384; 65/378; 65/386; 65/413; 65/427; 264/124
[58] Field of Search ................................. 65/384, 385, 386, 65/404, 413, 427, 434, 33.9, 66, 83, 111, 138, 378; 264/1.24; 385/129, 144

[56] References Cited

U.S. PATENT DOCUMENTS

| 5,117,470 | 5/1992 | Inoue et al. | |
| 5,179,614 | 1/1993 | Kanamori et al. | 65/386 X |
| 5,385,594 | 1/1995 | Kanamori et al. | 65/386 X |
| 5,503,650 | 4/1996 | Ishikawa et al. | 65/384 |

FOREIGN PATENT DOCUMENTS

| 0444582 | 9/1991 | European Pat. Off. . |
| 0545432 | 6/1993 | European Pat. Off. . |
| 58-105111 | 6/1983 | Japan . |

*Primary Examiner*—Melvin Mayes
*Attorney, Agent, or Firm*—Cushman Darby & Cushman IP Group of Pillsbury Madison & Sutro LLP

[57] ABSTRACT

This process for producing an optical waveguide comprises a step of sintering a glass fine-particle layer to form a upper cladding layer, and a step of controlling a refractive index of the upper cladding layer by changing a temperature decreasing rate when the glass layer is cooled down to the room temperature.

4 Claims, 9 Drawing Sheets

TAKEN OUT

⇓
TAKEN OUT

POSITION TO SUBSTRATE SURFACE (μm)

PROCESS FOR PRODUCING OPTICAL WAVEGUIDE

BACKGROUND OF THE INVENTION

1. Field of the Invention

The present invention relates to a process for producing an optical waveguide using the flame hydrolysis deposition method (hereinafter also called as the FHD method).

2. Related Background Art

A silica-base optical waveguide, which can be formed on a substrate, for example, of silicon, demonstrates low transmission losses and good compatibility with a silica-base optical fiber and is, therefore, drawing attention because of its excellent applicability to waveguide-type optical components or optical integrated circuits. A variety of processes for producing the optical waveguide have been proposed heretofore.

One of such conventional processes for producing the optical waveguide is the process for producing the optical waveguide using the FHD method, and a typical example is the method as disclosed in Japanese Laid-open Patent Application No. 58-105111.

SUMMARY OF THE INVENTION

The FHD method is a method for forming a glass layer by depositing a glass fine-particle layer on a substrate and sintering the glass fine-particle layer thus deposited. The inventors found out that the refractive index of the glass layer finally formed depended upon a temperature decreasing rate when the glass layer was cooled from a sintering temperature to the room temperature. Namely, two glass layers doped with a same amount of same impurities could have respective refractive indices different from each other depending upon the temperature decreasing rate from the sintering temperature to the room temperature.

The present invention is directed to a process for producing an optical waveguide, which comprises a step of sintering a glass fine-particle layer to form a glass layer (upper cladding layer), and a step of controlling a refractive index of the glass layer by changing a temperature decreasing rate when the glass layer is cooled down to the room temperature.

The glass layer is sintered at a predetermined temperature in the range of 1250° C. to 1450° C., and then is cooled at a temperature decreasing rate of from 1° C./min to 20° C./min from the predetermined temperature to a first temperature. Here, the first temperature is in the range of from greater than 400° C. to less than 800° C. After that, the glass layer is further cooled at a temperature decreasing rate of at least 50° C./min from the first temperature to the room temperature.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Before describing the embodiment according to the present invention, processes for producing the optical waveguide as comparative examples are first described referring to FIGS. 7A–7E to FIGS. 9(a)–9(e). A glass layer forming a waveguide is obtained by consolidating a glass fine-particle layer.

The glass fine-particle layer in the following is produced using the apparatus shown in FIG. 2A. This apparatus is provided with a chamber 12, a tube 13 for evacuating gases inside the chamber 12, a turn table 11 for a substrate 1 to be set thereon, a heater 14 for heating the turn table 11, and a gas burner 4 located in the vicinity of the substrate 1 and supplying glass materials. In the following description, sintering of the glass fine-particle layer is carried out by setting the glass fine-particle layer in a sintering furnace FA shown in FIG. 2B. The sintering furnace FA is provided with a setting plate PL1 on which the substrate 1 is set, a tube TU into which the setting plate PL1 is introduced, a heater HT1 located around the tube TU, a first heat insulator SM1 for closing one opening of the tube TU, and a second heat insulator SM2 for closing the other opening of the tube TU. The setting plate PL1 moves through a through hole HL1 formed in the second heat insulator SM2, so that it can set the substrate 1 in the heating furnace FA or it can take the substrate 1 out of the heating furnace FA.

Figure 7A:
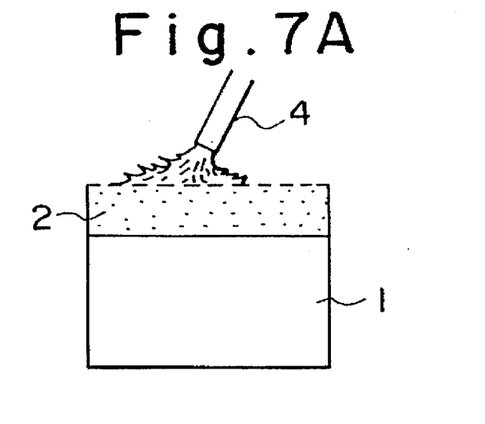
FIGS. 7A–7E are figures to show steps in a comparative method for producing the optical waveguide.

In the method shown in FIGS. 7A–7E, $SiCl_4$, $BCl_3$, and, $POCl_3$ or $PCl_3$ are first supplied to the burner 4 for synthesizing fine glass particles, thereby forming a porous glass layer 2 ($SiO_2+B_2O_3+P_2O_5$) to become a lower cladding layer on the substrate 1 of silicon or the like (FIG. 7A).

Figure 7B:
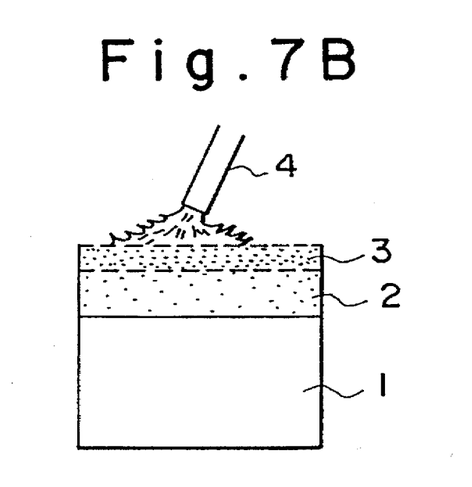

Next, $SiCl_4$ and $GeCl_4$; or $TiCl_4$, $BCl_3$, and, $POCl_3$ or $PCl_3$ are supplied to the burner for synthesizing fine glass particles, thereby forming a porous glass layer 3 ($SiO_2$+$GeO_2$ or $TiO_2$+$B_2O_3$+$P_2O_5$) to become a core layer on the porous glass layer 2 (FIG. 7B).

Figure 7C:
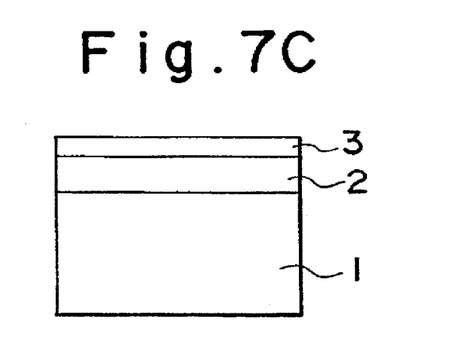
Figure 7D:
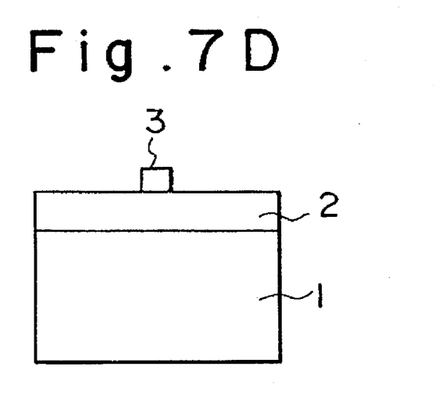

Subsequently, the porous glass layers 2, 3 are sintered to become transparent, thereby obtaining a lower cladding layer 2' and a core layer 3' of transparent glass (FIG. 7C).

Figure 7E:
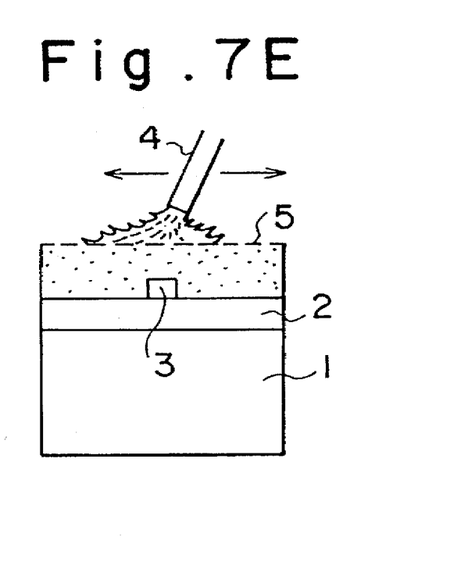

After that, appropriate patterning processing is applied to the core layer 3' of transparent glass to form a core portion (FIG. 7D), and then a porous glass layer 5 to become an upper cladding layer is formed in the same manner as in FIG. 7A and is sintered to become transparent (FIG. 7E).

Another production process may be arranged in such a manner that only a porous glass layer for lower cladding layer is first formed and is sintered to become transparent and thereafter a porous glass layer for core is then formed. Still another production process may be such that a material having optical transparency such as silica glass is used as a substrate and, using it as the lower cladding layer, a porous glass layer for core is formed thereon. Still another process may employ a completely different technique such as the PCVD method to form the core and the lower cladding.

Among these processes, there is a known technique for preventing the core from being deformed upon sintering of the upper cladding layer by such a method that after the lower cladding layer and the core layer are formed and when the upper cladding layer is formed using the above FHD method, as disclosed in Japanese Laid-open Patent Application No. 3-75606, an amount of $P_2O_5$ and $B_2O_3$ added to the upper cladding layer is made larger than those in the lower cladding and the core so that the softening temperature of the upper cladding layer becomes lower than that of the lower cladding or the core, whereby the sintering temperature of the upper cladding layer is lowered.

The present inventors newly discovered a phenomenon that in using the technique for preventing the deformation of the core upon sintering of the upper cladding layer by lowering the sintering temperature of the upper cladding layer as described above, where there was a difference between the softening temperature of the upper cladding layer and the softening temperature of the lower cladding layer or the core layer, particularly where the total dopant amount of $P_2O_5$ and $B_2O_3$ was different between the upper cladding and, the lower cladding or the core, differences were observed in index profile in the thickness direction in spite of no significant difference in composition profile in the thickness direction.

FIGS. 8(a)–8(e) and FIGS. 9(a)–9(e) are explanatory drawings to illustrate the phenomenon that a difference appears in index profile in the thickness direction.

FIGS. 8(a)–8(e) are graphs to show a waveguide A1, and dopant concentrations (mol %) in the waveguide A1 and its relative index difference (%) as functions of distance from the surface of the substrate 1.

Figures 8A, 8B, 8C:
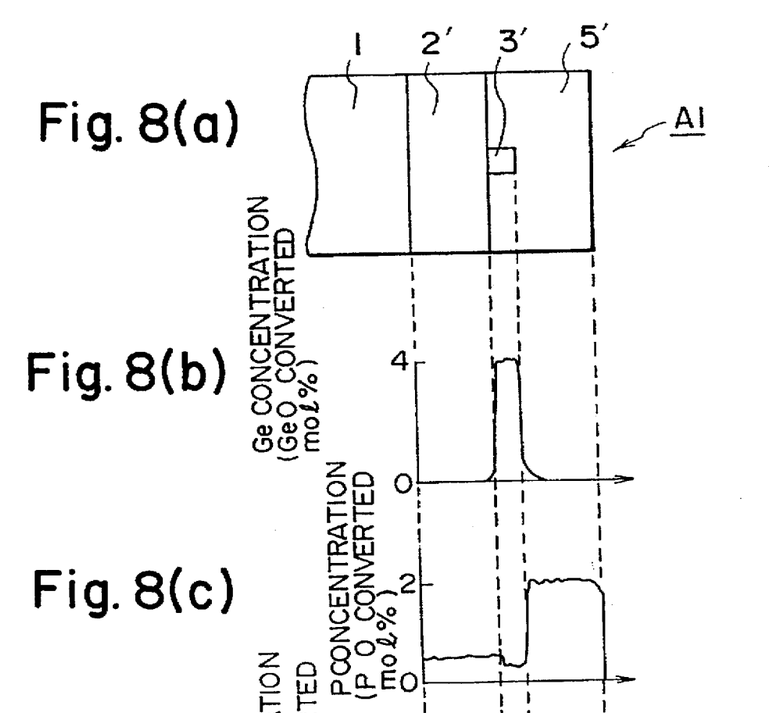
FIGS. 8(a)–8(e) are explanatory figures to show a first profile example of Ge, P, B, and refractive index of the optical waveguide produced according to a comparative example of the production process.

The waveguide A1 has a silicon substrate 1, a lower cladding layer 2', a core layer 3', and an upper cladding layer 5'.

To produce this waveguide A1, a relatively very small amount of $P_2O_5$ and $B_2O_3$ is first added to the glass fine-particle layer 2 upon forming the glass fine-particle layer 2 as shown in FIG. 7A. Then, upon forming the glass fine-particle layer 3 as shown in FIG. 7B, $GeO_2$ and a very small amount of $P_2O_5$ and $B_2O_3$ are added. The glass fine-particle layers 2, 3 sintered become the lower cladding layer 2' and the core layer 3', respectively. Further, in forming the glass fine-particle layer 5 shown in FIG. 7E, $P_2O_5$ and $B_2O_3$ are added each in an amount about four times greater than that added upon forming the lower cladding layer 2', to the glass fine-particle layer 5. This glass fine-particle layer is sintered to yield the upper cladding layer 5'.

FIGS. 9(a)–9(e) are graphs to show another waveguide B1, and dopant concentrations (mol %) in the waveguide B1 and its relative index difference (%) as functions of distance from the surface of substrate 1. The waveguide B1 has the same structure as the waveguide A1. The waveguide B1 is produced by setting a silicon substrate 10 instead of the silicon substrate 1 in the reactor shown in FIG. 2A and in the sintering furnace FA shown in FIG. 2B. In detail, the waveguide B1 has the silicon substrate 10, lower cladding layer 20', core layer 30', and upper cladding layer 50'. The silicon substrate 10, lower cladding layer 20', core layer 30', and upper cladding layer 50' in the waveguide B1 correspond to the silicon substrate 1, lower cladding layer 2', core layer 3', and upper cladding layer 5' in the waveguide A1, and the waveguide B1 is different from the waveguide A1 shown in FIG. 8(a) only in the temperature at which the substrate 10 is taken out of the sintering furnace FA upon forming the upper cladding layer 50'. The taking-out temperature of the waveguide B1 out of the sintering furnace FA is lower than the taking-out temperature of the waveguide A1 out of the sintering furnace FA.

Figure 8D:
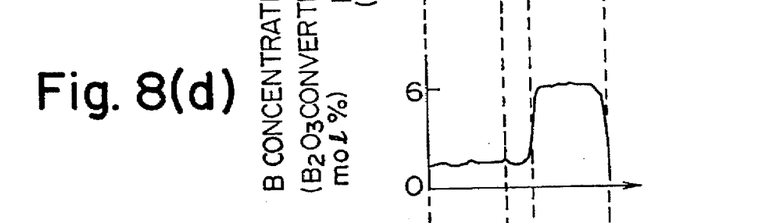
Figure 8E:
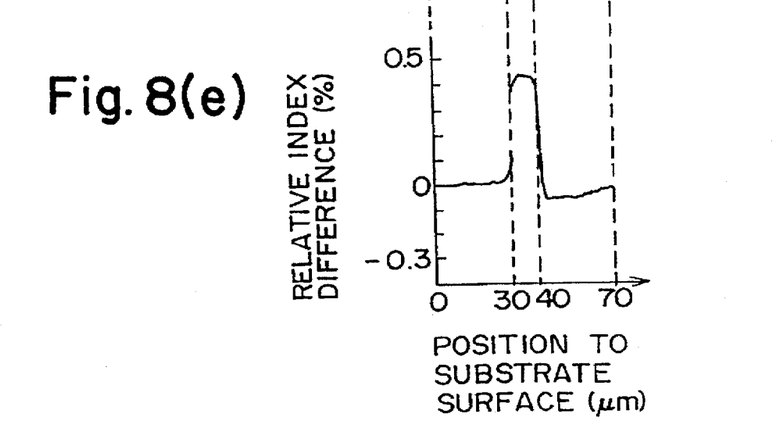
Figure 9A:
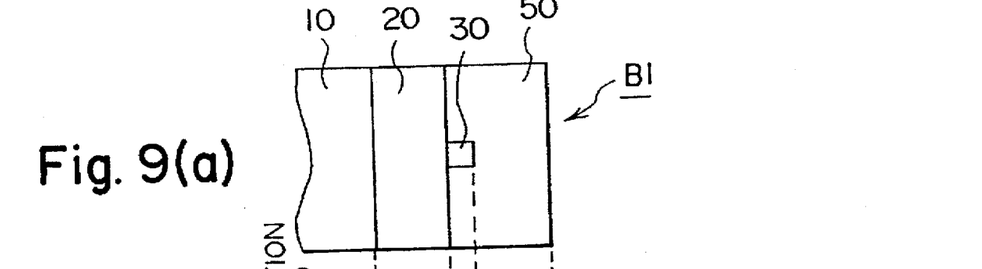
FIG. 9(a)–9(e) are explanatory figures to show a second profile example of Ge, P, B, and refractive index of the optical waveguide produced according to another comparative example of the production process.
Figures 9B, 9C, 9D:
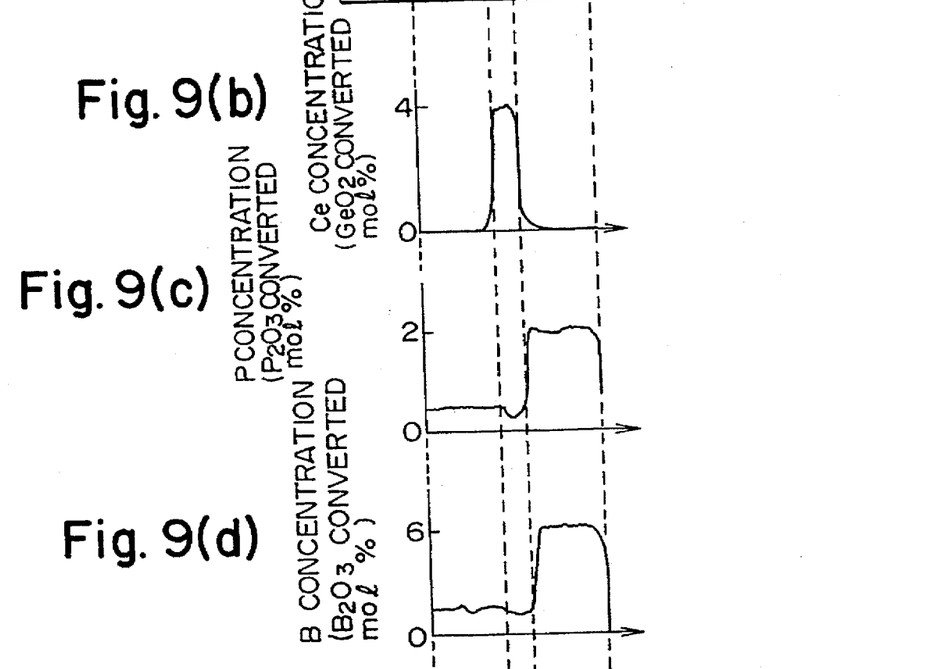
Figure 9E:
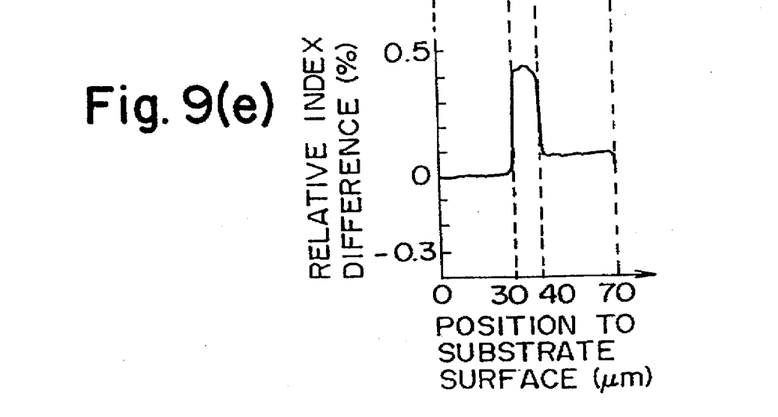

FIG. 8(a) and FIG. 9(a) show cross sections of the waveguide A1 and the waveguide B1, respectively; FIG. 8(b) and FIG. 9(b) show the measurement results of concentration distributions of Ge by the EPMA (electron probe microanalysis) method in the thickness direction (along the chain line in FIG. 8(a) and FIG. 9(a)) in the waveguide A1 and the waveguide B1, respectively; FIG. 8(c) and FIG. 9(c) show the measurement results of concentration distributions of P by the EPMA method; FIG. 8(d) and FIG. 9(d) show the measurement results of concentration distributions of B by the EPMA method. Further, FIG. 8(e) and FIG. 9(e) show representation of relative index difference in the unit of %, of the refractive index measured by the Refractive Near Field (RNF) method, relative to an average refractive index of the lower cladding.

From the data in FIG. 8(b) to (d) and FIG. 9(b) to (d) as described above, there is no significant difference between the composition distributions (concentration distributions of impurities) in the waveguide A1 and waveguide B1, taking account of the measurement accuracy in the EPMA method. However, there is a big difference between the index profiles of the two waveguides shown in FIG. 8(e) and FIG. 9(e). Particularly, considering the average index of the lower cladding layer as a reference, the refractive index of the upper cladding layer 5' in the waveguide A1 is lower, but conversely, the refractive index of the upper cladding layer 50' in the waveguide B1 is higher. Such variations in the refractive index of the upper cladding layer even for a same glass composition would result in, for example, changing branch characteristics when an optical waveguide type directional coupler is formed to multiplex and/or demultiplex light, thus failing to achieve desired characteristics.

The present invention has been accomplished taking account of the above point, and an object of the invention is to provide a process for producing an optical waveguide which can be provided with a desired refractive index approximately coincident with a designed value for each of the core layer and the cladding layer as being waveguide elements of light.

Prior to description of the embodiment, the phenomenon utilized in the process for producing the optical waveguide according to the present invention will be further described.

The refractive index of a glass film for optical waveguide is fundamentally determined by the composition of dopants. The glass film for optical waveguide produced by the FHD method, particularly the glass film for upper cladding, is doped with $P_2O_5$ to increase the refractive index of silica glass and with $B_2O_3$ to decrease the refractive index. Both $P_2O_5$ and $B_2O_3$ are added particularly to the upper cladding layer in order to decrease the softening temperature of silica glass, and the composition of $P_2O_5$ and $B_2O_3$ is determined so as to make the refractive index of the upper cladding layer become a predetermined value (generally, a value approximately equal to that of the lower cladding layer).

The present inventors, however, found out a phenomenon that the refractive index of the upper cladding layer changed depending upon cooling conditions after sintering of the upper cladding layer. Namely, upon cooling the optical waveguide after sintered, the refractive index decreases more as the cooling rate becomes quicker in the case of glass films in a same composition. In other words, the present inventors found out that the phenomenon as described referring to FIG. 7A to FIGS. 9(a)–9(e) resulted from differences of cooling conditions after sintering, which has never been considered.

Now, the embodiment of the process for producing the optical waveguide according to the present invention is described.

Figure 1A:
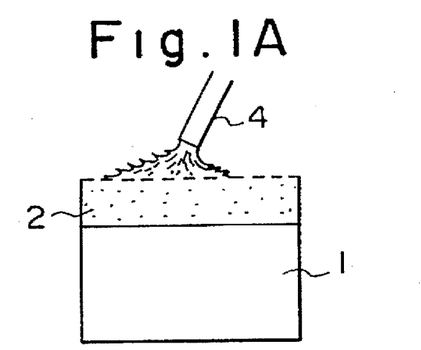
FIGS. 1A–1F are figures to show steps in the process for producing the optical waveguide as an embodiment of the present invention.
Figure 1B:
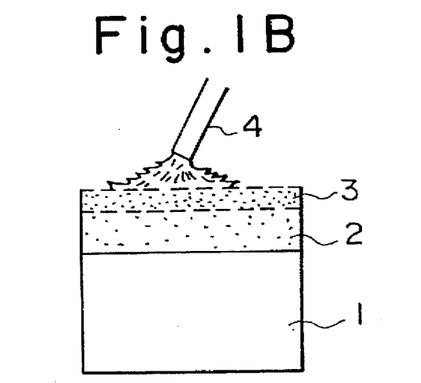
Figure 1C:
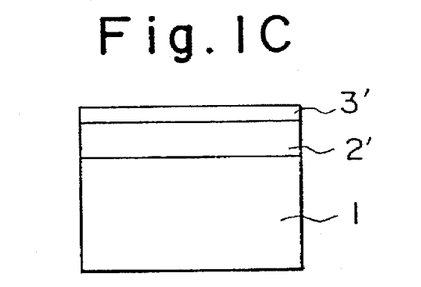
Figure 1D:
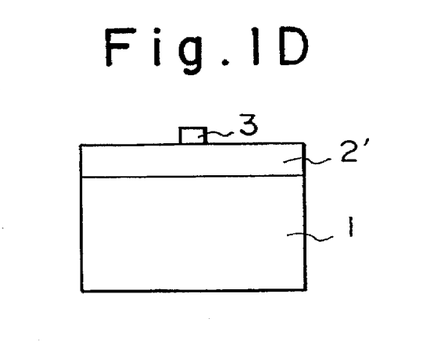
Figure 1E:
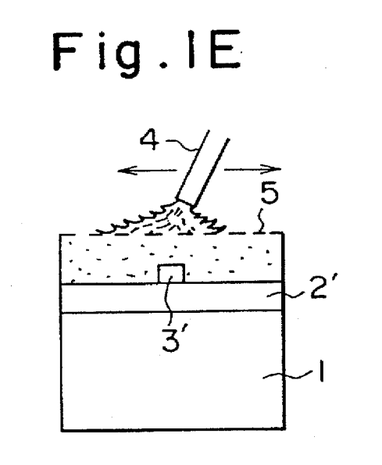
Figure 1F:
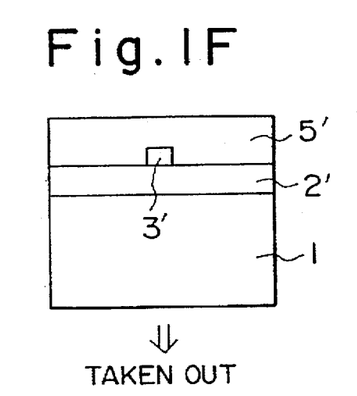
Figure 2A:
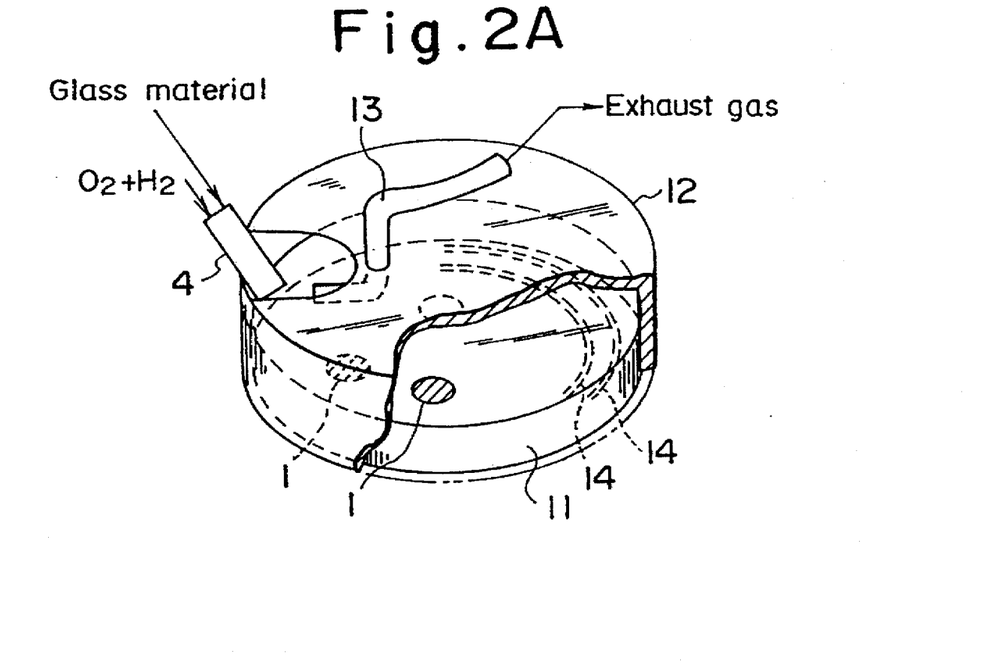
FIG. 2A is a structural figure of an apparatus for producing the optical waveguide by the FHD method.
Figure 2B:
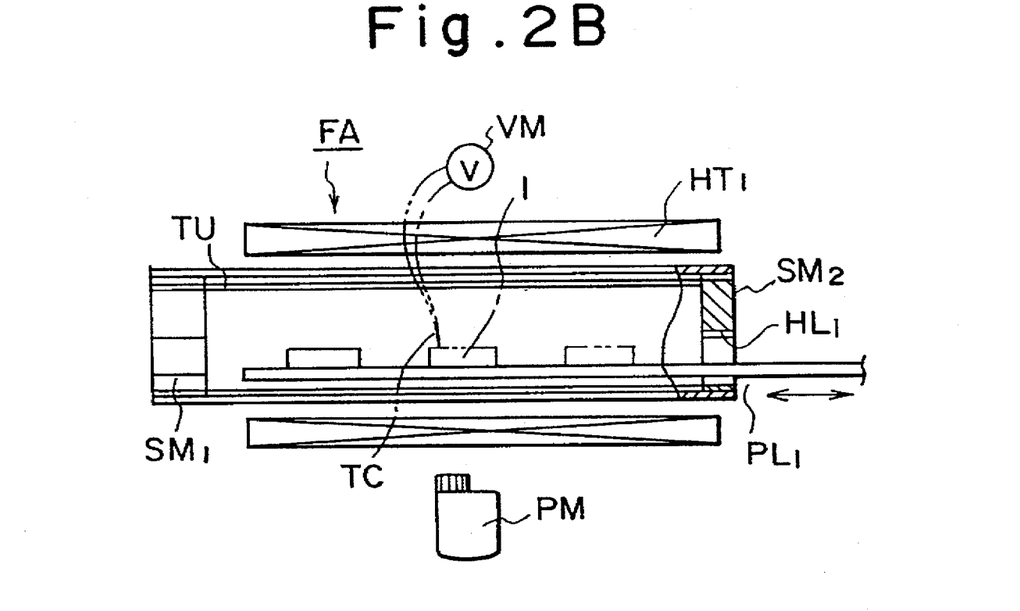
FIG. 2B is a figure to show a sintering furnace for consolidating the glass fine-particle layer.

FIGS. 1A–1F are process diagrams to show steps in the process for producing the optical waveguide in the embodiment, and the optical waveguide is produced by depositing a glass fine-particle layer on the substrate using the apparatus of FIG. 2A and consolidating the glass fine-particle layer thus deposited in the sintering furnace of FIG. 2B.

First, the glass fine-particle layer 2 was formed on a silicon wafer of diameter of three inches by the FHD method and then was sintered (FIG. 1A) and the glass fine-particle layer 3 for core layer was formed thereon by the FHD method and then was sintered (FIG. 1B). Types and flow rates of raw gases supplied to the burner 4 upon forming the lower cladding layer and the core layer are those as listed in the following Table 1. The unit of gas flow rate is sccm.

TABLE 1

|  | $H_2$ | $O_2$ | Ar | $SiCl_4$ | $POCl_3$ | $BCl_3$ | $GeCl_4$ |
|---|---|---|---|---|---|---|---|
| Lower Cladding layer | 2,000 | 6,000 | 3,000 | 100 | 3 | 18 | — |
| Core | 2,000 | 6,000 | 3,000 | 100 | 2 | 12 | 10 |

Next, the porous glass layers 2, 3 were sintered to become transparent, thereby obtaining the lower cladding layer 2' and core layer 3' of transparent glass (FIG. 1C). After that, appropriate patterning processing was applied to the core layer 3' of transparent glass to form the core portion 3' (FIG. 1D).

Upon depositing the glass fine particles, the substrate 1 was placed on the turn table 11 heated at about 600° C. by the heater 14 and at that time the turn table was rotated at speed of 10 rpm.

Also, sintering of the glass fine-particle layers 2, 3 was carried out in such a manner that the substrate 1 with fine glass particles being deposited thereon was introduced into the furnace FA kept at temperature 800° C. and filled with the atmosphere of $He:O_2=10:1$, this substrate 1 was thereafter heated at a temperature increasing rate of 20° C./min up to 1400° C., then the substrate 1 was held thereat for three hours, the temperature was decreased at a temperature decreasing rate of 10° C./min down to 800° C., and thereafter the substrate was taken out of the furnace FA into the environment at the room temperature.

The glass fine-particle layer 5 was deposited under five conditions on the thus produced substrate 1 in which the lower cladding layer 2' and the core layer 3' were formed (FIG. 1E). Samples produced under these different conditions will be called as No. 1, No. 2, No. 3, No. 4, and No. 5. Table 2 shows flow rates of gases supplied to the gas burner 4 in producing these samples. The unit of gas flow rate in the table 2 is sccm.

TABLE 2

| Sample | Gas | | | | | |
|---|---|---|---|---|---|---|
|  | $H_2$ | $O_2$ | Ar | $SiCl_4$ | $POCl_3$ | $BCl_3$ |
| No. 1 | 2,000 | 6,000 | 3,000 | 100 | 12 | 40 |
| No. 2 | 2,000 | 6,000 | 3,000 | 100 | 9 | 48 |
| No. 3 | 2,000 | 6,000 | 3,000 | 100 | 4.5 | 60 |
| No. 4 | 2,000 | 6,000 | 3,000 | 100 | 12 | 85 |
| No. 5 | 2,000 | 6,000 | 3,000 | 100 | 4.5 | 25 |

The number of revolutions of the turn table was 10 rpm and the temperature $T_{glass}$ of the substrate upon depositing the glass fine-particle layer thereon was 600° C.

It is desirable that $T_{glass}$ should be between 200° C. and 800° C. both inclusive.

Sample No. 1 shown in Table 2 was taken out of the reactor shown in FIG. 2A and then introduced into the sintering furnace FA shown in FIG. 2B. Upon introduction of sample No. 1 the inside of the sintering furnace FA is held at 800° C. The inside of the sintering furnace FA is filled with the atmosphere of $He:O_2=10:1$. When sample No. 1 is introduced into the sintering furnace FA, the temperature thereof quickly increases up to 800° C. A temperature increasing rate of sample No. 1 at this time is at least 100° C./min.

It is desirable that the temperature increasing rate $R_{HU1}$ this time should be between 100° C./min and 5000° C./min both inclusive.

When the temperature of sample No. 1 becomes equal to the temperature inside the sintering furnace FA, the temperature of sample No. 1 is held at 800° C. This temperature is called as preheat temperature $T_{pre}$.

It is desirable that the preheat temperature $T_{pre}$ should be between 200° C. and 1000° C. both inclusive.

Next, the temperature inside the sintering furnace FA is increased at a temperature increasing rate of 20° C./min from 800° C. to 1250° C., thereby increasing the temperature of sample No. 1 from 800° C. to 1250° C. to sinter and consolidate the glass fine-particle layer 5.

It is desirable that the second temperature increasing rate $R_{HU2}$ this time should be between 1° C./min and 100° C./min both inclusive.

Sample No. 1 is held at this sintering temperature $T_{sinter}$ (1250° C.) for one hour, so that the glass fine-particle layer 5 in sample No. 1 consolidates to form the upper cladding layer 5'. It is desirable that this sintering temperature $T_{sinter}$ should be between 1100° C. and 1450° C. both inclusive.

Next, sample No. 1 was cooled at a temperature decreasing rate of 10° C./min from 1250° C. to a taking-out temperature $T_{out}$ and thereafter was taken out of the sintering furnace FA into the environment at room temperature (FIG.

1F). Namely, sample No. 1 was cooled at the first temperature decreasing rate $R_{HD1}$ from the sintering temperature $T_{sinter}$ to the taking-out temperature $T_{out}$ and thereafter sample No. 1 was cooled at the second temperature decreasing rate $R_{HD2}$ from the taking-out temperature $T_{out}$ to the room temperature $T_{room}$ (25° C.).

In this case, it is desirable that the taking-out temperature $T_{out}$ should be not more than 700° C. or not less than 900° C. It is desirable that the first temperature decreasing rate $R_{HD1}$ should be between 1° C./min and 20° C./min both inclusive.

It is desirable that the second temperature decreasing rate $R_{HD2}$ should be between 50° C./min and 5000° C./min both inclusive.

Subsequently, samples No. 2–No. 5 shown in Table 2 were also processed in the same method as sample No. 1 to form the upper cladding layer thereon. Sintering temperatures $T_{sinter}$ of these samples are listed in Table 3.

TABLE 3

| Sample | $T_{sinter}$ (°C.) |
|---|---|
| No. 1 | 1250 |
| No. 2 | 1250 |
| No. 3 | 1250 |
| No. 4 | 1200 |
| No. 5 | 1350 |

Figure 3:
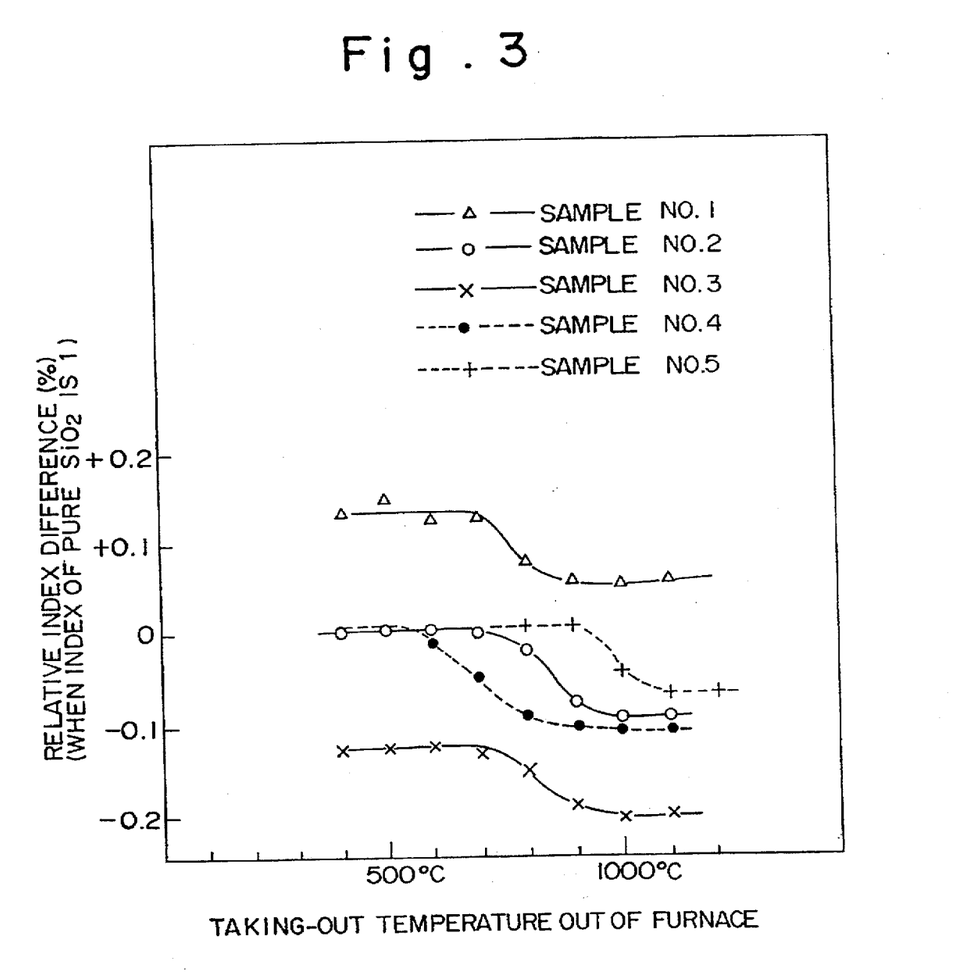
FIG. 3 is a graph to show a relation between a taking-out temperature out of the sintering furnace and the refractive index of a glass film for optical waveguide.

FIG. 3 is a graph to show a relationship between the taking-out temperature Tout and the relative index difference (%) of the upper cladding layer 5' finally formed to the index of pure silica glass at room temperature. In FIG. 3, the refractive index of the upper cladding layer was measured while changing the temperature Tout from 400° C. to 1000° C.

Table 4 shows concentrations (mol %) of $P_2O_5$ and $B_2O_3$ contained in the upper cladding layer 5' in each sample. These concentrations were measured by EPMA.

TABLE 4

| Sample | $P_2O_5$ (mol %) | $B_2O_3$ (mol %) |
|---|---|---|
| No. 1 | 3 | 5 |
| No. 2 | 2 | 6 |
| No. 3 | 1 | 7 |
| No. 4 | 3 | 9 |
| No. 5 | 1 | 3 |

As seen from FIG. 3, for example under the conditions of sample No. 1, if the taking-out temperature $T_{out}$ out of the sintering furnace FA is not more than 700° C., the relative index difference is stable between +0.12 and 0.13%; but the index decreases as the taking-out temperature $T_{out}$ out of the sintering furnace FA increases between 700° C. and 1000° C., For more clarification of this phenomenon, a sample which had been taken out of the sintering furnace FA at the taking-out temperature $T_{out}$ of 500° C. in sample No. 1 was heated up to 1000° C. and then quickly cooled down to the room temperature. Then the index difference thereof was +0.05%, which was equivalent to that of the sample taken out of the sintering furnace FA at 1000° C.

Conversely, another sample having been taken out of the sintering furnace FA at 1000° C. was again heated up to 1000° C. and slowly cooled at a temperature decreasing rate of 10° C./min down to 500° C. The relative index difference thereof was +0.12%, which was equivalent to that of the sample taken out of the sintering furnace at 500° C. This clarified that the degree of quick cooling depending upon a difference of the taking-out temperature out of the sintering furnace was a significant factor to determine a value of the refractive index of the glass film for optical waveguide.

Accordingly, the taking-out temperature out of the sintering furnace must be precisely controlled in order to obtain a desired index value in a stable manner. Particularly, for example, in the case of sample No. 1, a small change of the taking-out temperature $T_{out}$ becomes a factor of index change where the taking-out temperature $T_{out}$ out of the sintering furnace FA is between 700° C. and 1000° C. The index change, however, is relatively small insofar as the taking-out temperature $T_{out}$ is not more than 700° C. or not less than 1000° C. Too high taking-out temperatures $T_{out}$ could cause problems of breakage etc. of the waveguide itself or a jig upon quick cooling.

It is thus desirable that the taking-out temperature for sample No. 1 should be not more than 700° C. Here, the upper limit of the taking-out temperature at which the index can be obtained in a stable manner is defined as a maximum stable taking-out temperature $T_{max}$. The maximum stable taking-out temperature $T_{max}$ of sample No. 1 is 700° C. Also, the taking-out temperature $T_{out}$ is desirably not less than 400° C.

Samples No. 1, 2, 3 each have the maximum stable taking-out temperature $T_{max}$ of about 700° C. Samples No. 1, 2, 3 are different in composition ratio of $P_2O_5$ and $B_2O_3$ but constant in total amount thereof (8 mol %). It is thus considered that the maximum stable taking-out temperature $T_{max}$ is substantially determined by the total amount of $P_2O_5$ and $B_2O_3$ in the optical waveguide.

Figure 4:
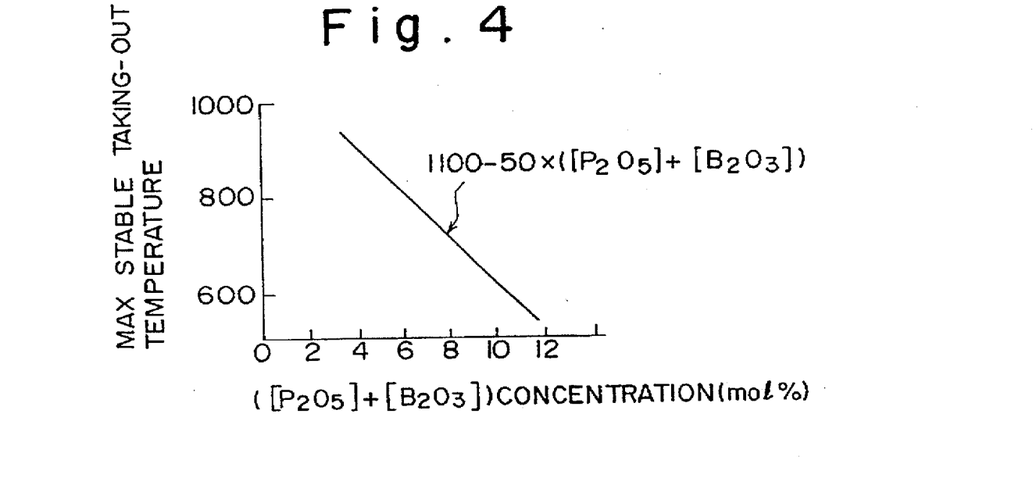
FIG. 4 is a graph to show a relation between a dopant concentration of $P_2O_5$ and $B_2O_3$ and a maximum stable taking-out temperature.

FIG. 4 is a graph to show an empirically obtained relationship of the maximum stable taking-out temperature $T_{max}$ against the total amount of $P_2O_5$ and $B_2O_3$. Letting $[P_2O_5]$ and $[B_2O_3]$ be a dopant amount of $P_2O_5$ and a dopant amount of $B_2O_3$ as expressed in mol %, the maximum stable taking-out temperature $T_{max}=T_{out}$ (°C.) can be expressed as follows from FIG. 4.

$$T_{max}=T_{out}=1100-50\times([P_2O_5]+[B_2O_3]) \tag{1}$$

In the above experiments the temperature decreasing rate $R_{HD1}$ from the sintering temperature $T_{sinter}$ to the taking-out temperature was 10° C./min, but a sufficient slow cooling effect was not attained at the temperature decreasing rate $R_{HD1}$ of not less than 20° C./min. In contrast, if the temperature decreasing rate $R_{HD1}$ is less than 1° C./min, too much time is necessary for slow cooling, which is inefficient, and it is not suitable for practical application. Nevertheless, there is no negative effect observed on the characteristics.

The above results suggest that the refractive index of an optical waveguide taken out of the sintering furnace FA off the range of Equation (1) can be modified to a selected value by reheating.

Figure 5:
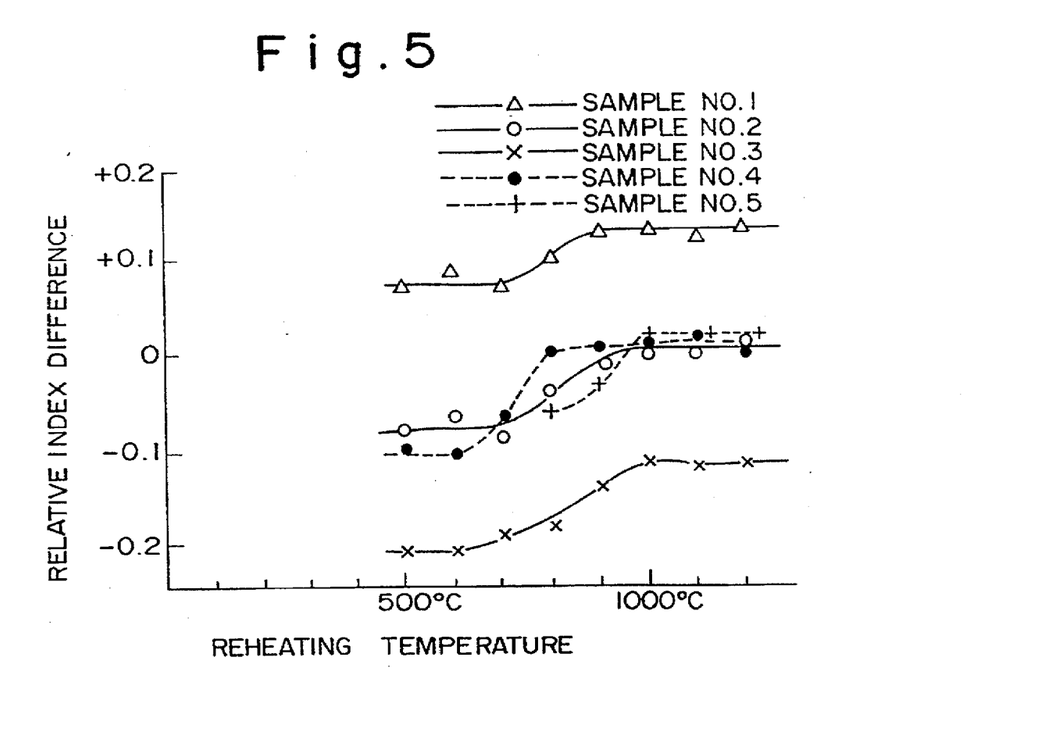
FIG. 5 is a graph to show a relation between a reheating temperature and the refractive index of the glass film for optical waveguide.

FIG. 5 shows a relation between the reheating temperature Ta (°C.) and the relative index difference (%) of the upper cladding layer 5' when the respective samples were reheated at a temperature higher than the maximum stable taking-out temperature $T_{max}$ and thereafter these samples were cooled at a temperature decreasing rate of 10° C./min down to 500° C.

Figure 6:
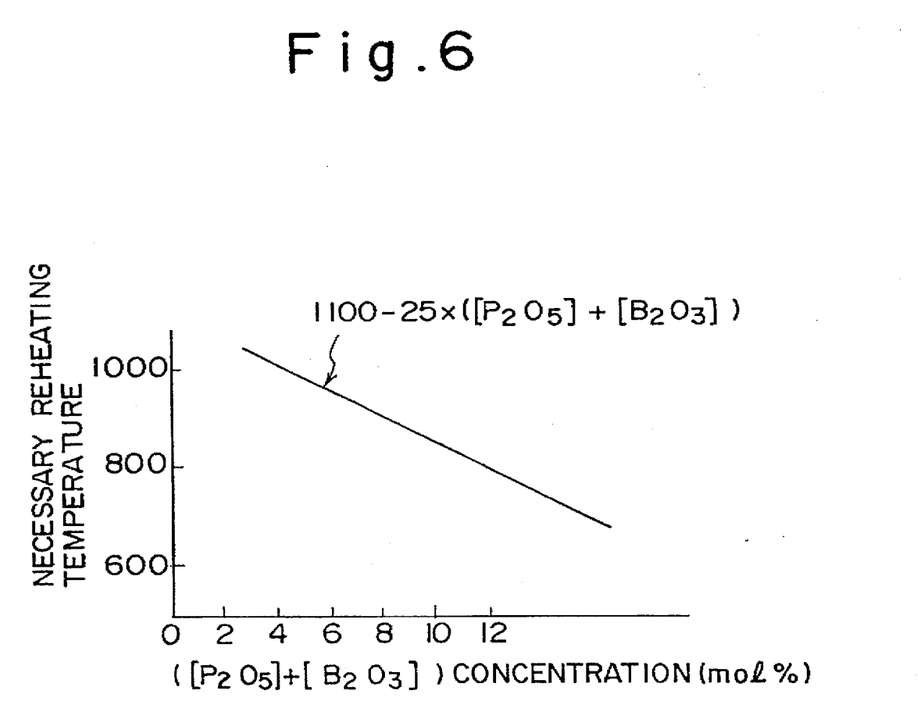
FIG. 6 is a graph to show a relation between a dopant concentration of $P_2O_5$ and $B_2O_3$ and a necessary reheating temperature.

As seen from FIG. 5, for example, when sample No. 1 is taken out of the sintering furnace FA at a higher temperature than the maximum stable taking-out temperature thereof $T_{max}$ (700° C.), and if sample No. 1 is reheated above 900° C. and then is cooled down to 500° C., it demonstrates a refractive index nearly equal to that of the sample taken out of the sintering furnace FA at a temperature of not more than 700° C. However, if the reheating temperature Ta (°C.) is below 900° C., the resultant index still remains low. The necessary reheating temperature Ta (°C.) can be almost uniquely expressed as follows against the total amount of $P_2O_5$ and $B_2O_3$, as shown in FIG. 6.

$$Ta=1100-25\times([P_2O_5]+[B_2O_3]) \quad (2)$$

It was empirically confirmed that this relation held if the slow cooling temperature rate after reheating was within the range of 1° C./min to 20° C./min.

The control of temperatures (Tout, Ta, etc.) of the samples in the above description was carried out in the following procedures. A thermocouple TC is preliminarily inserted to a sample position in the furnace and a relation is obtained between a surface temperature of heater HT1 measured by a radiation pyrometer PM and a temperature at the sample position. Namely, the temperature of sample 1 is measured by a voltmeter VM connected to the thermocouple TC and the temperature of heater HT1 is measured by the radiation pyrometer PM, thus obtaining the temperature measured by the thermocouple TC and the temperature measured by the radiation pyrometer PM. Since the measurement accuracy of the radiation pyrometer PM is higher than that of the thermocouple TC at high temperatures above 1200° C., actual temperatures of samples are obtained from those measured by the radiation pyrometer PM. Namely, upon heating a sample, the sample temperature in the furnace is controlled to a desired value by measuring the temperature of heater HT1 by the radiation pyrometer PM and controlling the temperature (FIG. 2B).

Figure 10:
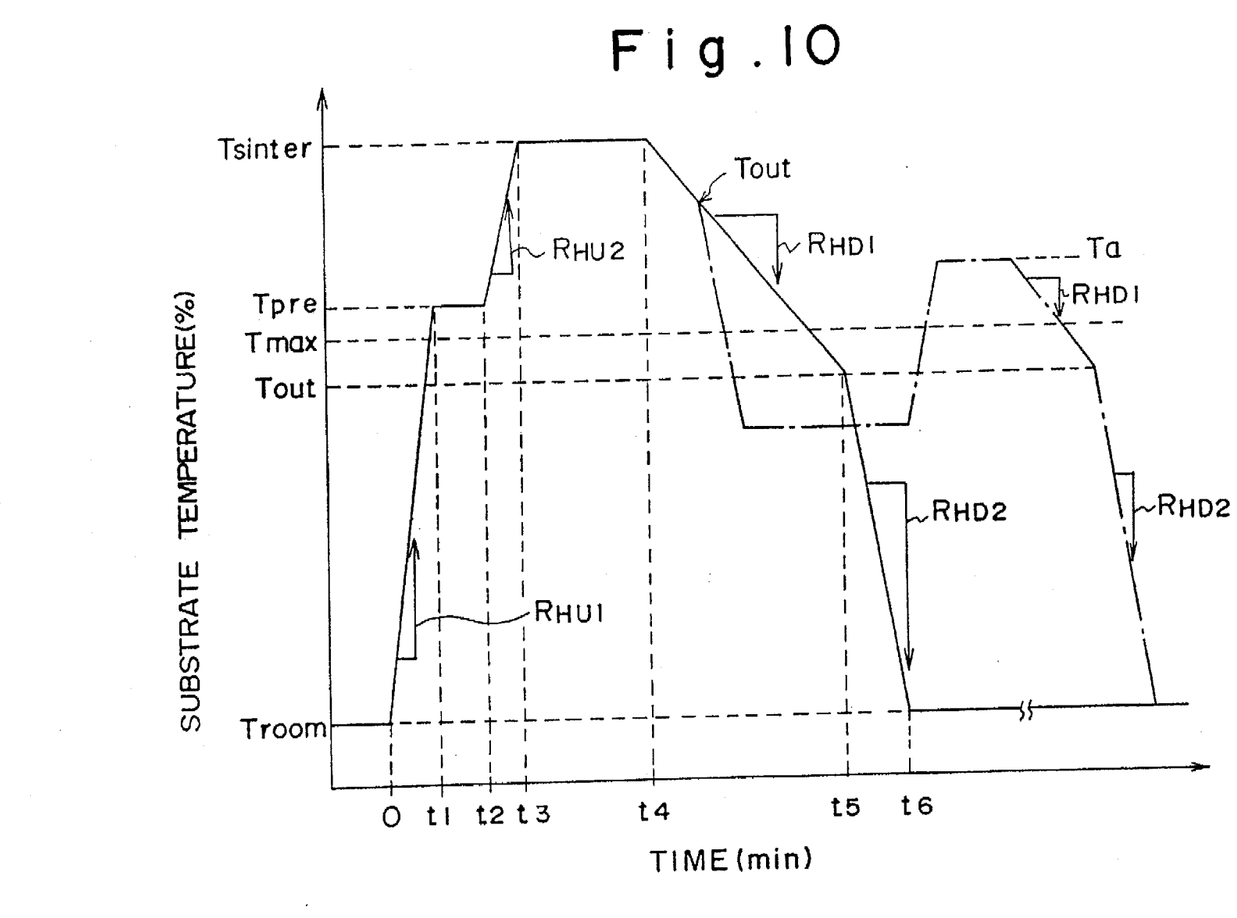
FIG. 10 is a graph to illustrate the temperature control in the production process of the present invention.

The above results are summarized in FIG. 10.

The process for producing the optical waveguide in the present embodiment comprises a step of sintering the glass fine-particle layer 5 at the sintering temperature $T_{sinter}$ to form consolidated glass layer 5', and a step of controlling the refractive index of the glass layer 5' by changing the temperature decreasing rate ($R_{HD1}$, $R_{HD2}$) when the glass layer 5' is cooled from the sintering temperature $T_{sinter}$ to the room temperature $T_{room}$.

The sintering temperature $T_{sinter}$ is in the range of from 1100° C. to 1450° C. Further, the consolidated glass layer 5' is cooled at the temperature decreasing rate $R_{HD1}$ of between 1° C./min and 20° C./min from the sintering temperature $T_{sinter}$ to the taking-out temperature $T_{out}$, and thereafter is cooled at the temperature decreasing rate $R_{HD2}$ of not less than 50° C./min from the taking-out temperature $T_{out}$ to the room temperature $T_{room}$. It is desirable that the taking-out temperature $T_{out}$ should be in the range of from 400° C. to 900° C. In order to avoid differences of refractive index of glass layer 5' between products, the glass layer 5' is preferably taken out at a temperature below the maximum taking-out temperature $T_{max}$. $T_{max}$ (°C.) satisfies the following formula, which is a function of concentrations of impurities added to the glass layer 5'.

$T_{max}=1100-50\times([P_2O_5]+[B_2O_3])$, where $[P_2O_5]$ is a molar concentration (mol %) of $P_2O_5$ contained in the upper cladding layer 5' and $[B_2O_3]$ is a molar concentration (mol %) of $B_2O_3$ contained in the upper cladding layer 5'.

In the production process, when the taking-out temperature $T_{out}'$ for taking out the substrate 1 with the upper cladding layer 5' formed therein is higher than $T_{max}$, the refractive index of the upper cladding layer 5' is lower than that when the substrate 1 is taken out at a temperature lower than $T_{max}$. In this case, the obtained upper cladding layer 5' is heated at the reheating temperature Ta. The reheating temperature Ta satisfies the following formula: $Ta=1100-25\times([P_2O_5]+[B_2O_3])$, where $[P_2O_5]$ is a molar concentration (mol %) of $P_2O_5$ contained in the upper cladding layer 5' and $[B_2O_3]$ is a molar concentration (mol %) of $B_2O_3$ contained in the upper cladding layer 5'. When the glass layer 5' is reheated and thereafter cooled at the temperature decreasing rate $T_{out}$ and then it is cooled at the second temperature decreasing rate $R_{HD2}$ larger than the first temperature decreasing rate $R_{HD1}$, the refractive index of the glass layer 5' becomes higher than the refractive index at time t6.

Further described are other numerical values shown in FIG. 10. Time 0 min is a time when the substrate 1 is inserted into the sintering furnace FA kept at 800° C. Time t1 is a time when the substrate reaches the temperature in the sintering furnace FA, so that the substrate 1 is heated at temperature $T_{pre}$ from time t1 to time t2.

The temperature increasing rate $R_{HU1}$ is defined as $(T_{pre}-T_{room})/(t_1-t_0)$. A time period from $t_0$ to $t_1$ is between 0.1 min and 10 min both inclusive.

A time period from $t_1$ to $t_2$ is between 0 min to 60 min.

The temperature increasing rate $R_{HU2}$ is defined as $(T_{sinter}-T_{pre})/(t_3-t_2)$. A time period from $t_2$ to $t_3$ is between 1 min and 1250 min both inclusive.

The glass fine-particle layer 5 is sintered between time $t_3$ and time $t_4$, and a time periode from $t_3$ to $t_4$ is between 0.1 min and 720 min both inclusive.

The glass layer 5' consolidated between time $t_4$ and time $t_5$ is cooled at the temperature decreasing rate of $R_{HD1}$. The temperature decreasing rate $R_{HD1}$ is defined as $(T_{sinter}-T_{out})/(t_5-t_4)$. A time period from $t_4$ to $t_5$ is between 10 min and 1050 min both inclusive.

The glass layer 5' consolidated between time $t_5$ and $t_6$ is cooled at the temperature decreasing rate of $R_{HD2}$. The temperature decreasing rate $R_{HD2}$ is defined as $(T_{out}-T_{room})/(t_6-t_5)$. A time period from $t_5$ to $t_6$ is between 0.4 min and 18 min both inclusive.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 84630/1994 filed on Apr. 22, 1994 is hereby incorporated by reference.

What is claimed is:

1. A process for producing an optical waveguide, comprising the steps of:

supplying gases including $POCl_3$ and $BCl_3$ to a burner arranged near a substrate to form a layer of glass fine-particles;

heating the layer at a first temperature to sinter the layer;

cooling the sintered layer, at a rate between 1° and 20° C./min from the first temperature to a second temperature; and cooling the sintered layer at a rate of not less than 50° C./min from the second temperature to a third temperature, to form an upper cladding layer including $P_2O_5$ and $B_2O_3$ from the cooled layer;

wherein the second temperature T° C. satisfies the following expression;

$$400 < T < 1100 - 50 \times (C_1 + C_2),$$

where, $C_1$ is a molar concentration of $P_2O_5$ in the cladding layer;

$C_2$ is a molar concentration of $B_2O_3$ in the cladding layer, and $C_1 + C_2$ is equal to or greater than 6.

2. A process for producing an optical waveguide, comprising the steps of:

supplying gases including $POCl_3$ and $BCl_3$ to a burner arranged near a substrate to form a layer of glass fine-particles;

heating the layer at a first temperature to sinter the layer;

cooling the sintered layer, at a rate between 1° and 20° C./min from the first temperature to a second temperature; and cooling the sintered layer at a rate of not less than 50° C./min from the second temperature to a third temperature, to form an upper cladding layer including $P_2O_5$ and $B_2O_3$ from the cooled layer;

wherein the second temperature T° C. satisfies the following expression;

$$400 < T < 1100 - 50 \times (C_1 + C_2),$$

where, $C_1$ is a molar concentration of $P_2O_5$ in the cladding layer;

$C_2$ is a molar concentration of $B_2O_3$ in the cladding layer, and $C_1 + C_2$ is equal to or greater than 8.

3. A process for producing an optical waveguide, comprising the steps of:

forming a lower cladding layer on a substrate;

forming a core on said lower cladding layer; and forming an upper cladding layer on said core, said step comprising the steps of:

(a) depositing glass fine particles on said core;

(b) heating said substrate at a sintering temperature to consolidate said glass fine particles to form said upper cladding layer; and (c) cooling said substrate from said sintering temperature to a room temperature to control a refractive index of said upper cladding layer by changing a temperature decreasing rate upon said cooling, said cooling step comprising the steps of:

(i) cooling said substrate from said sintering temperature to a second temperature;

(ii) heating said substrate up to a third temperature higher than a first temperature after said step (i);

(iii) cooling said substrate at a first temperature decreasing rate from said third temperature to said first temperature after said step (ii); and (iv) cooling said substrate at a second temperature decreasing rate larger than said first temperature decreasing rate down to the room temperature after said step (iii).

4. The process according to claim 3, wherein said first temperature is in the range of 400° C. to 900° C. and said second temperature is in the range of 200° C. to 1000° C., and said third temperature is in the range of 800° C. to 1200° C.

* * * * *